May 16, 1961 A. L. EAMES 2,984,240
CABINET FOR VAPOR IMMUNIZATION OF FOWLS
Filed Dec. 19, 1957
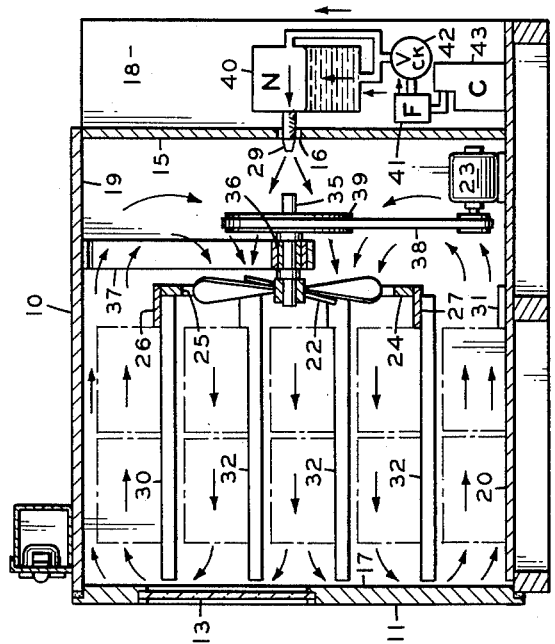
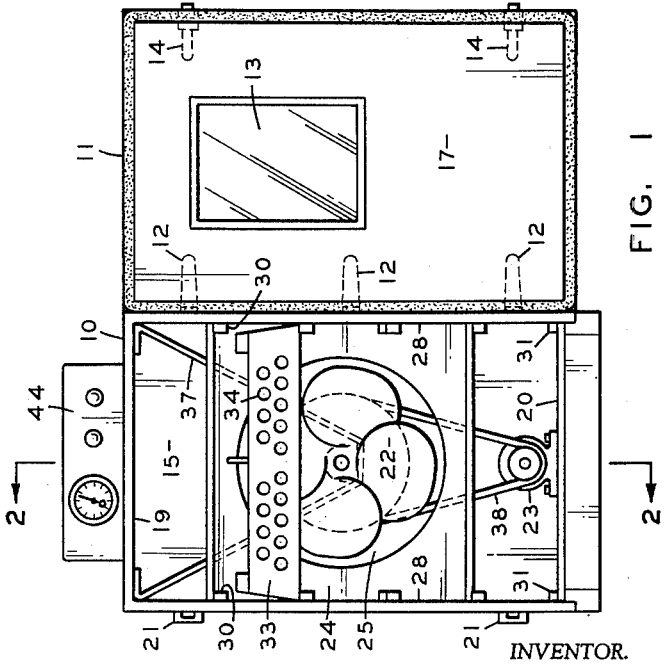
INVENTOR.
ARVID LEE EAMES
BY
ATTORNEY United States Patent Office 2,984,240
Patented May 16, 1961

2,984,240

CABINET FOR VAPOR IMMUNIZATION OF FOWLS

Arvid Lee Eames, Box 136, Cedar Hill, Mo.

Filed Dec. 19, 1957, Ser. No. 703,904

3 Claims. (Cl. 128—185)

This invention relates to new and useful improvements in apparatus for immunization of poultry chicks and other fowls through their respiratory tracts by exposing them to vaccine vapors.

Heretofore, apparatus for immunization of poultry and other fowls through their respiratory tracts has required pre-saturation of the vaccination chamber with vaccine vapors before open-topped containers or trays of poultry are placed in the chamber. After the poultry containers have been placed in the pre-saturated chamber, a fresh supply of vaccine vapors has been circulated in a horizontal circular pattern around and over the containers, by fans spaced around the perimeter of the chamber. Such apparatus necessarily is dependent on the vaccine vapors settling into the containers. Also, the pre-saturation condition is disturbed in the process of placing the containers in the chamber. The pre-saturated air in the chamber is in large measure replaced by the unsaturated air in the containers when they are placed therein. The circulation after the containers are placed in the chamber is not such as will achieve uniform saturation.

It is a primary object of this invention to provide an apparatus for immunization of poultry chicks and other fowls through their respiratory tracts wherein the vaccine vapors are gradually supplied and distributed throughout a vaccination chamber including the containers for such fowls, and wherein there is continuous circulation of such vapors and replenishing of vaccine therein. It is a further object of the present invention to provide such an apparatus wherein no pre-saturation is necessary and uniform distribution of such vapors is achieved while the containers for such fowls are in the vaccination chamber. It is a further object of the present invention to provide such an apparatus wherein there is uniform distribution of vaccine vapors simultaneously throughout a large number of containers for such poultry and other fowls. Further objects will appear from the specification following.

In the accompanying drawing:

Figure 1 is a front elevational view of a cabinet embodying the present invention showing one standard ventilated poultry chick tray therein;

Figure 2 is a side view of the same cabinet in section, taken along line 2—2 of Figure 1, with ten of such standard trays shown therein in dotted lines, and with arrows illustrating the pattern of circulation of vaccine vapors.

The cabinet illustrated in Figures 1 and 2 comprises a rectangular sealed chamber generally designated 10 including a door 11 mounted on hinges 12 and having a window 13 and latch handles 14. Said chamber further includes an inlet vertical wall 15 having an inlet opening 16 centrally disposed therein. Opposite the inlet vertical wall 15 is a substantially smooth-surfaced vertical deflector wall 17. In the particular embodiment shown the door 11 is opposite the inlet vertical wall 15, and thus the inner surface of the door 11 constitutes the vertical deflector wall 17. Connecting the inlet vertical wall 15 and the opposite deflector wall 17 are a pair of vertical walls 18, a top wall 19 and a bottom wall 20. In the particular embodiment shown, with the door 11 opposite the inlet vertical wall 15, the hinges 12 are mounted on one of said connecting vertical walls 18 and catches 21 are mounted on the opposite wall 18, thus permitting the door 11 to be sealed by engagement of the latch handle 14 with the catches 21.

Disposed within said chamber 10 is a rotating-blade circulating fan 22 spacedly adjacent the inlet opening 16 and concentrically located with respect to said opening. The fan 22 is mounted on a shaft 35 which is in turn mounted rotatably within a bushing 36 supported from the top wall 19 by a V-shaped bracket 37. Said fan 22 is so disposed that the direction of its thrust is generally perpendicularly away from the inlet vertical wall 15, and perpendicularly toward the deflector wall 17. The fan 22 is rotated by a belt 38 which turns a sheave 39 secured to the shaft 35. The belt 38 is driven by an electric motor 23, supplied by a power source not shown.

Mounted within the chamber 10 by its side edges is a baffle plate 24 having a central circular opening 25 within which the fan 22 is located. Said baffle plate 24 also includes an upper edge 26 spaced downwardly from the top wall 19 of the chamber 10, a lower edge 27 spaced upwardly from the bottom wall 20 of the chamber 10, and a pair of outer side edges 28 abutting the connecting vertical walls 18. Said baffle surrounds the fan 22, is substantially concentric therewith, and may be substantially within the plane of said fan.

The source of vaccine vapor to be circulated within the chamber 10 by the fan 22 includes a nozzle 29 sealingly fitted within the inlet opening 16 and communicating between said chamber 10, and a nebulizer 40 disposed outside said chamber 10. Also disposed outside the chamber 10 is an air filter 41 communicating with the nebulizer 40, a check valve 42 being disposed therebetween, and a compressor 43 communicating with the filter 41.

Affixed within the chamber 10 are upper support means or tray holders, which are shown in the particular embodiment as upper brackets 30, for supporting a plurality of ventilated poultry trays above the upper edge 26 of the baffle plate 24, and lower support means or tray holders which are shown in the particular embodiment as lower brackets 31 for supporting a plurality of these poultry trays below the lower edge 27 of the baffle plate 24. Intermediate said upper brackets 30 and lower brackets 31 are a plurality of intermediate support means or tray holders, which are shown in the particular embodiment as intermediate brackets 32, for supporting a plurality of poultry trays substantially at the level of the fan 22. Whether one, two, three or more intermediate tray support means are used will determine the diameter of the fan 22 which is most suitable.

Tray-support brackets 30, 31 and 32 are secured along the side walls 18 so as to support such ventilated trays adjacent the plane of rotation of the blades of the fan 22 and spacedly from the deflector wall 17.

The particular embodiment shown in Figures 1 and 2 has been designed for use with two columns of five standard ventilated poultry chick trays such as the poultry tray 33 shown in Figure 1. Such standard poultry trays are normally perforated with large ventilating openings 34 on two sides; however, this invention may be used for any ventilated tray or container suitable for holding the fowl to be immunized and which may be presented to permit therethrough the circulation of air as shown by the arrows in Figure 2.

Mounted on top wall 19, outside the chamber 10, is a central panel 44 whereby to control the introduction of vaccine vapor into the chamber 10, the rotation of the fan 22, the time of exposure, and to record and/or control temperature and humidity.

Immunization of poultry or other fowls in this apparatus is accomplished by placing said poultry or fowls in suitable ventilated trays, such as the poultry chick tray 33; placing such trays within the chamber 10 on support means such as the brackets 30, 31 and 32, and arranging such trays as shown in Figure 2 so that the ventilaton openings in said trays are opposite said fan and said deflector wall; closing and sealing the door 11. The compressor 43 is then activated, forcing air through the filter 41 into the nebulizer 40, which nebulizes a vaccine contained therein so as to combine said vaccine in vapor form with such filtered air, the resultant vaccine vapor then being forced by the compressor 43 through the nozzle 29 and the inlet opening 16 into the chamber 10. The fan 22 then propels such vaccine vapor through the circular opening 25 of the baffle plate 24 and thrusts it forward through the ventilating openings of the trays 33 supported by the intermediate brackets 32. The perforations 34 in the walls of the trays 33 render them partial baffles for the vaccine vapor, causing part of it to circulate within the individual trays 33 while another part passes through the openings 34. After such vaccine vapor passes through such intermediate trays it is deflected by the deflector wall 17 substantially perpendicularly upward and downward, in roughly equal quantities, and thence circulates back through the ventilated trays 33, supported by the upper brackets 30 and lower brackets 31; thence above and below the baffle plate upper edge 26 and lower edge 27 respectively and back into the exhaust area of the fan 22. Here the air combines with a fresh supply of such vaccine vapor and then repeats the same pattern of circulation.

Various changes may be made without departing from the present invention. Thus it may be preferable, where certain vaccines are used, to reverese the fan 22 so as to thrust the vaccine vapor backward toward the inlet vertical wall 15 which will deflect it upward and downward and through the trays supported by the upper brackets 30 and lower brackets 31, after which it will be deflected upward and downward by the deflector wall 17, through the trays supported by the intermediate brackets 32, and thence into the exhaust area of the fan, from whence the fan 22 will draw such vapor through the central opening 25 of the baffle plate 24 to combine it with a fresh supply of vaccine vapor and thus repeat the pattern of circulation.

For convenience, the terms backward and forward have been used as if the inlet vertical wall 15 were the "back" of chamber 10. Thus "forward" is away from said wall 15 and "backward" is toward it.

Having described the present invention, what I claim is:

1. An apparatus for treatment of poultry in ventilated poultry trays by introduction through their respiratory tracts of vapors, comprising a rectangular sealed chamber including a door, an inlet vertical wall having a centrally disposed inlet opening, an opposite vertical deflector wall, and a pair of connecting vertical walls, a source of such vapor in communication with said inlet opening, a circulating fan disposed within said chamber spacedly adjacent said inlet opening and concentrically located with respect to said inlet opening, the direction of its thrust being perpendicular to said inlet vertical chamber wall, a baffle plate having a circular opening within which said fan is disposed, upper and lower edges respectively spaced from the top and bottom of said chamber, and outer edges abutting said connecting vertical chamber walls, upper and lower brackets for supporting such poultry trays spacedly from said deflector wall and respectively above and below the upper and lower edges of said baffle plate, and a plurality of intermediate brackets for supporting such poultry trays spacedly from said deflector wall at the level of said fan.

2. The apparatus as defined in claim 1 in combination with air compressor means, air filter means communicating therewith, and nebulizer means communicating with said filter means and said chamber inlet opening.

3. An apparatus for treatment of poultry by introduction through their respiratory tracts of vapors and the like, comprising a rectangular sealed chamber including a door, an inlet vertical wall having a centrally-disposed inlet opening, an opposite vertical deflector wall, and a pair of connecting vertical walls, a source of such vapor in communication with said inlet opening, an upper layer of poultry containers, a lower layer of poultry containers, and a plurality of intermediate layers of poultry containers, said containers being removably supported within said chamber adjacent said connecting vertical walls and spacedly from said inlet vertical wall and said opposite deflector wall, each said container having opposing perforate sides respectively facing said inlet vertical wall and said opposite deflector wall, a circulating fan disposed within said chamber spacedly between said inlet vertical wall and said layers of poultry containers, said fan being concentrically located with respect to said inlet opening and adjacent said intermediate layers of poultry containers, and a baffle plate having a circular opening within which said fan is disposed, an upper edge above said intermediate layers of poultry containers and below said upper layer of poultry containers, a lower edge below said intermediate layer of poultry containers and above said lower layer of poultry containers, and outer edges abutting said connecting vertical chamber walls.

References Cited in the file of this patent

UNITED STATES PATENTS

| 1,714,635 | Schafer | May 28, 1929 |
| 2,184,685 | Brace | Dec. 26, 1939 |
| 2,319,091 | Smith et al. | May 11, 1943 |
| 2,791,199 | Hamnett | May 7, 1957 |
| 2,833,245 | Stephens | May 6, 1958 |
| 2,847,993 | Woodruff | Aug. 19, 1958 |